(12) United States Patent
Ritter et al.

(10) Patent No.: US 8,407,313 B2
(45) Date of Patent: Mar. 26, 2013

(54) OBTAINING CUSTOMIZED CONTENT USING A PILOT PACKET

(75) Inventors: Phillip A. Ritter, Danville, CA (US); Benjamin J. Parker, Vacaville, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 222 days.

(21) Appl. No.: 13/036,613

(22) Filed: Feb. 28, 2011

(65) Prior Publication Data

US 2012/0221674 A1 Aug. 30, 2012

(51) Int. Cl.
*G06F 15/16* (2006.01)

(52) U.S. Cl. ........ 709/217; 709/219; 709/203; 709/228; 709/233; 709/223; 455/435.1; 455/423; 455/432.1; 370/352; 370/310; 370/328

(58) Field of Classification Search .................. 709/217, 709/219, 203, 223, 233, 230, 228
See application file for complete search history.

(56) References Cited

U.S. PATENT DOCUMENTS

| 7,454,206 | B1* | 11/2008 | Phillips et al. | 455/435.1 |
| 7,610,396 | B2* | 10/2009 | Taglienti et al. | 709/233 |
| 7,787,879 | B1* | 8/2010 | Philips et al. | 455/435.1 |
| 2003/0009536 | A1* | 1/2003 | Henderson et al. | 709/219 |
| 2010/0154047 | A1* | 6/2010 | Roach et al. | 726/9 |

* cited by examiner

*Primary Examiner* — Jude Jean Gilles (57) ABSTRACT

A system is configured to receive a request to register a user device with a network; perform an operation that registers the user device and enables the user device to obtain content from another network; generate a packet that includes information associated with the user device and information associated with the operation; output the packet to a device, where the packet enables the device to obtain information associated with usage habits corresponding to the user device; receive, from the user device, a query to obtain the content from the other network; output, to the device, a content request based on the query; receive, from the device and based on the content request, the content that is customized for the user device based on the information associated with the usage habits; and output the customized content to the user device.

23 Claims, 5 Drawing Sheets

OBTAINING CUSTOMIZED CONTENT USING A PILOT PACKET

BACKGROUND

Service provider networks transport network traffic associated with a variety of services, applications, and content. The service provider networks provide more and more services, applications, and content that are customized to user devices. The customized services, applications, and content may be based on usage habits, a user profile, etc. associated with the user devices. Additionally, the customized services, applications, and content may be based on information associated with the user devices, such as types of user devices, network addresses, etc. and/or context information associated with user devices, such as locations of the user devices, types of user devices, etc. Unfortunately, as the service provider networks transport more and more traffic, the service provider networks do not always have the capacity to process the traffic in a manner that provides the customized services to the user devices.

DETAILED DESCRIPTION OF PREFERRED EMBODIMENTS

The following detailed description refers to the accompanying drawings. The same reference numbers in different drawings may identify the same or similar elements.

Systems and/or methods, described herein, may enable a pilot application to generate a pilot packet that is to be used to customize content for a user device during a communication session. The pilot application may store, in the pilot packet, information associated with the user device and/or information associated with network address translation (NAT) bindings that correspond to the user device. The pilot application may transmit the pilot packet to a network device (e.g., a service control gateway). The service control gateway may use the information associated with the user device and/or the NAT bindings, obtained from the pilot packet, to retrieve information associated with user habits, user preferences, a user profile, etc. that corresponds to the user device. The service control gateway may use the information associated with the user habits, user preferences, and/or user profile to customize the content to be served to the user device.

As described herein the pilot application may obtain the information associated with the NAT bindings based on a NAT operation performed on the user device. The information, associated with the NAT bindings, may include a private Internet protocol (IP) address, one or more ports associated with the private IP address, a unique public IP address, a device identifier, etc. The pilot application may store the information, associated with the NAT bindings, in the pilot packet.

The pilot packet may enable the user device to be identified within a particular period of time. The particular period of time may be less than another period of time associated with the service control gateway retrieving, from another device (e.g., an authentication, authorization, and accounting (AAA) server, a server that generates the NAT bindings, etc.), all or a portion of the information associated with the user device and/or the NAT bindings. The other period of time may, for example, correspond to the service control gateway obtaining a public IP address (e.g., from a packet received from the user device) and using the public IP address to retrieve the information, associated with the user device and/or the NAT bindings, from the other device.

Using the pilot packet to identify the user device, within the particular period of time, may increase a quantity of processing capacity available to customize content for the user device. The pilot packet may also increase a quantity of content that can be customized over a certain time period.

The term "packet," as used herein, is intended to be broadly construed to include a frame, a datagram, a packet, or a cell; a fragment of a frame, a fragment of a datagram, a fragment of a packet, or a fragment of a cell; or another type, arrangement, or packaging of data.

Figure 1:
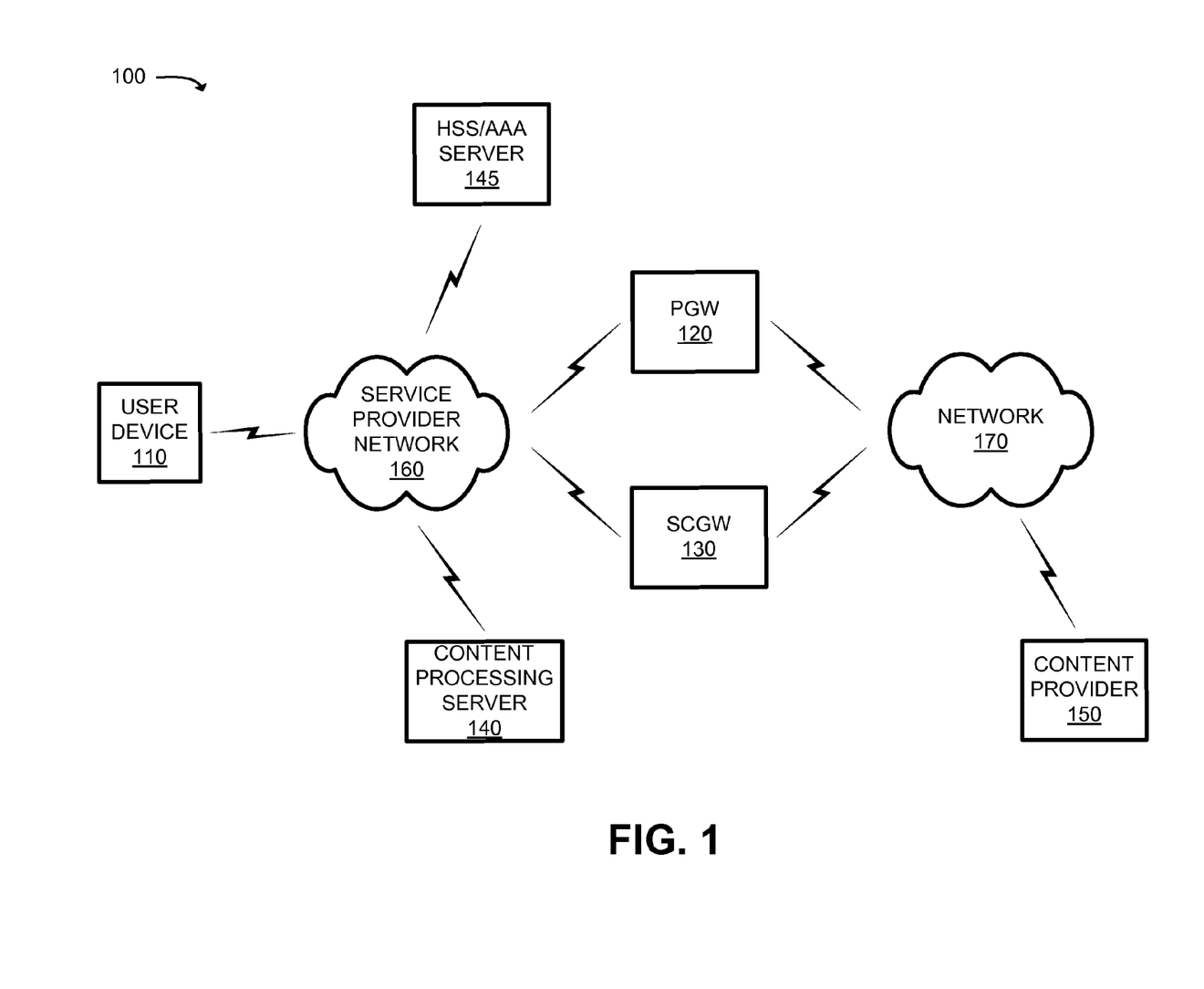
FIG. 1 is a diagram of an example environment in which systems and/or methods, described herein, may be implemented.

FIG. 1 is a diagram of an example environment 100 in which systems and/or methods, described herein, may be implemented. As shown in FIG. 1, environment 100 may include a user device 110, a packet data network (PDN) gateway (PGW) device 120 (hereinafter referred to as a "PGW 120"), a service control gateway (SCGW) device 130 (hereinafter referred to as a "SCGW 130"), a content processing server 140 (hereinafter referred to as a "CP server 140"), a home subscriber/authentication, authorization, and accounting server 145 (hereinafter referred to as a "HSS/AAA 145"), a content provider 150, a service provider network 160, and a network 170. The number of devices and/or networks, illustrated in FIG. 1, is provided for explanatory purposes only. In practice, there may be additional devices and/or networks; fewer devices and/or networks; different devices and/or networks; or differently arranged devices and/or networks than illustrated in FIG. 1.

Also, in some implementations, one or more of the devices of environment 100 may perform one or more functions described as being performed by another one or more of the devices of environment 100. For example, PGW 120 and SCGW 130 may be integrated into a single device. In another example, SCGW 130 and CP server 140 may be integrated into a single device. Alternatively, PGW 120, SCGW 130, CP server 140, and/or HSS/AAA 145 may be implemented as multiple, possibly distributed, devices. Devices of environment 100 may interconnect via wired connections, wireless connections, or a combination of wired and wireless connections.

User device 110 may include any computation or communication device that is capable of communicating via service provider network 160. For example, user device 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a personal computer, a landline telephone, a set top box (STB), a television, a camera, a personal gaming system, or another type of computation or communication device. The description to follow will generally refer to user device 110 as a wireless mobile communication device. The description is not limited, however, to a wireless mobile communication device and may equally apply to other types of user devices.

User device 110 may register with service provider network 160 by communicating with HSS/AAA 145. User device 110 may, in response to a request from HSS/AAA 145, provide information to HSS/AAA 145 that enables user device 110 to be authenticated and/or registered with service provider network 160. User device 110 may transmit, via service provider network 160, requests for content from one or more content providers 150.

PGW 120 may include one or more network devices, or other types of computation or communication devices, that gather, process, search, store, and/or provide information in a manner described herein. For example, PGW 120 may include a gateway, a router, a switch, a firewall, a network interface card (NIC), a hub, a bridge, a proxy server, an optical add-drop multiplexer (OADM), or some other type of device that processes and/or transfers traffic (e.g., packets). In one example implementation, PGW 120 may include a device that aggregates traffic received from one or more user devices 110 and may send the aggregated traffic to network 170 and/or SCGW 130. In another example implementation, PGW 120 may receive traffic from network 170 and/or SCGW 130 and may send the traffic toward user device 110.

PGW 120 may perform network address translation (NAT) operations on user device 110. For example, PGW 120 may receive a packet associated with an operation to register user device 110 and may assign an internal IP address (e.g., an IP address used by service provider network 160). PGW 120 may assign a range of ports (e.g., sometimes referred to as a port range and/or a port chunk), associated with the internal IP address, via which traffic received from and/or sent to user device 110 is to be transported. PGW 120 may assign a public IP address to user device 110 that corresponds to the internal IP address and/or port range. The public IP address may be used by network 170 and/or devices with which PGW 120 communicates via network 170. PGW 120 may identify a time period (e.g., a lease) for which the internal IP address and/or port range is to be used. PGW 120 may store, as information associated with NAT bindings (e.g., in a memory associated with PGW 120), information obtained as a result of the NAT operation. For example, the information associated with the NAT bindings may include the internal IP address, port range, public IP address, lease, etc.

PGW 120 may host a pilot application that is used to generate a pilot packet. The pilot application may, for example, generate a pilot packet associated with user device 110. The pilot application may store, within one or more fields associated with the pilot packet, the information associated with the NAT bindings. Additionally, or alternatively, the pilot application may store, in the one or more fields, information associated with user device 110, such as a device identifier (e.g., a mobile director number (MDN), a media access control (MAC) address, etc.) and/or a physical device identifier (e.g., an international mobile subscriber identity (IMSI), an international mobile equipment identity (IMEI), an electronic serial number (ESN), a mobile identification number (MIN), a mobile subscriber integrated services digital network (MSISDN) number, a national access identifier (NAI), etc.). The pilot application may cause PGW 120 to send the pilot packet to SCGW 130 so that SCGW 130 may identify user device 110 and/or customize content for user device 110.

SCGW 130 may include one or more network devices that gather, process, search, store, and/or provide information in a manner described herein. For example, SCGW 130 may include a gateway, a router, a switch, a firewall, a NIC, a hub, a bridge, a proxy server, an OADM, or some other type of device that processes and/or transfers traffic. SCGW 130 may receive a pilot packet from PGW 120 and may obtain, from the pilot packet, information associated with user device 110. SCGW 130 may, for example, use the information, associated with user device 110, to convert content (e.g., received from content provider 150) into a format and/or protocol that is compatible with user device 110.

SCGW 130 may use the information, associated with user device 110, to retrieve, from HSS/AAA 145, information, associated with usage habits, a user profile, etc. that corresponds to user device 110. For example, CP server 140 may use the information associated with the user profile, to process content in a manner that ensures that the content is sent to user device 110 in a manner that satisfies a quality of service (QoS) threshold indentified within the information associated with the user profile.

SCGW 130 may use the retrieved information associated with the usage habits, user profile, etc. to process the content in a manner that is targeted and/or customized for user device 110 (e.g., based on content genre, parental controls, a type of content, etc.). In another example, SCGW 130 may forward the retrieved information, associated with the usage habits, user profile, etc. to CP server 140 to process the content.

CP server 140 may include one or more server devices, or other types of computation or communication devices, that gather, process, search, store, and/or provide information in a manner described herein. CP server 140 may, in one example implementation, perform operations associated with content processing within environment 100. CP server 140 may, for example, process content, received from content provider 150, in a manner that ensures that the content is targeted and/or customized for user device 110. CP server 140 may perform the processing based on the information associated with the usage habits, user profile, etc., (e.g., received from SCGW 130 and/or retrieved from HSS/AAA 145). CP server 140 may, for example, remove and/or extract particular content (e.g., particular types, genres, ratings, etc.) from the content, so that the processed content conforms to the information associated with the usage habits, user profile, etc.

HSS/AAA 145 may include one or more server devices, or other types of computation or communication devices, that gather, process, search, store, and/or provide information in a manner similar to that described herein. For example, HSS/AAA 145 may manage and/or store, in a memory associated with HSS/AAA 145, user profile information associated with user device 110 that includes access point names (APNs) that are permitted for and/or accessible by user device 110, information associated with a user of user device 110 (e.g., a username, a password, a personal identification number (PIN), etc.), rate information, minutes allowed, and/or other information. APNs may identify particular applications services and/or data that are permitted for user device 110. HSS/AAA 145 may store information associated with usage habits and/or preferences of user device 110, such as preferred content types (e.g., videos, movies, music, etc.), preferred content genres (e.g., horror, sports, country music, etc.), purchasing history or patterns, parental controls (e.g., exclude content with a restricted (R) rating, etc.). Additionally, or alternatively, HSS/AAA 145 may perform AAA operations when registering user device 110 with service provider network 160.

Content provider 150 may include one or more server devices, or other types of computation or communication devices, that provide any type or form of content. For example, content provider 150 may provide free television broadcasts (e.g., local broadcasts, such as NBC, CBS, ABC, and/or Fox), for-pay television broadcasts (e.g., TNT, ESPN, HBO, Cinemax, CNN, etc.), and/or Internet-based content (e.g., Youtube, Vimeo, Netflix, Hulu, Veoh, etc.) streamed from web sites. Content provider 150 may produce media streams (e.g., television broadcasts). A "media stream," as used herein, may refer to stream of content that includes video content (e.g., a video stream), audio content (e.g., an audio stream), textual content (e.g., a textual stream), and/or a combination of the aforementioned content.

Service provider network 160 may include one or more wired and/or wireless networks via which user devices 110 communicate and/or receive content. For example, service provider network 160 may include a cellular network, the Public Land Mobile Network (PLMN), a second generation (2G) network, a third generation (3G) network, a fourth generation (4G) network (e.g., a long term evolution (LTE) network), a fifth generation (5G) network, and/or another network. Additionally, or alternatively, service provider network 160 may include a wide area network (WAN), a metropolitan area network (MAN), an ad hoc network, an intranet, a fiber optic-based network, and/or a combination of these or other types of networks.

Network 170 may include one or more wired and/or wireless networks. For example, network 170 may include a cellular network, the PLMN, a 2G network, a 3G network, a 4G network (e.g., a LTE network), a 5G network, and/or another network. Additionally, or alternatively, network 170 may include a WAN, a MAN, a telephone network (e.g., the Public Switched Telephone Network (PSTN)), an ad hoc network, an intranet, the Internet, a fiber optic-based network, and/or a combination of these or other types of networks.

Figure 2:
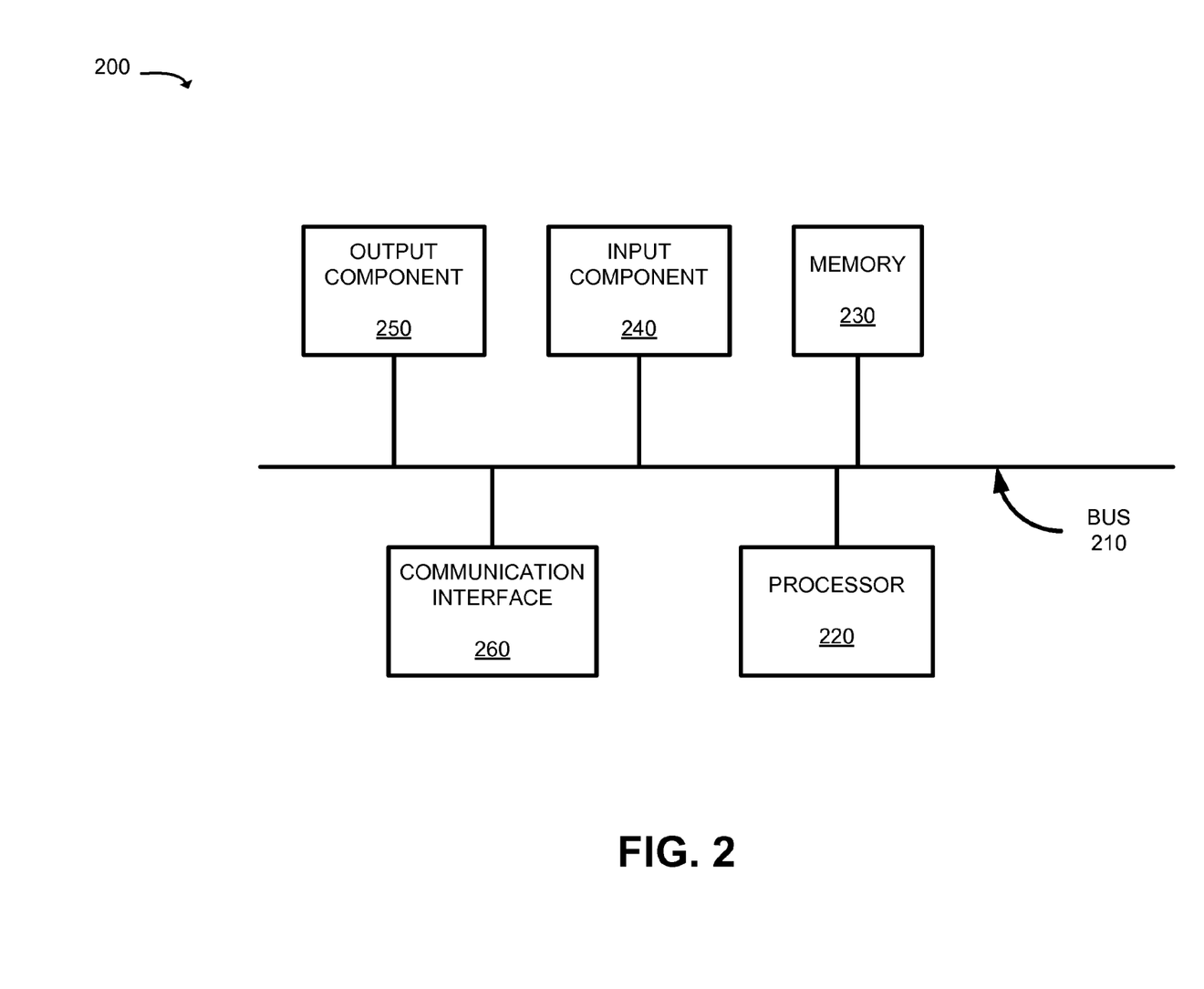
FIG. 2 is a diagram of example components of one or more of the devices of FIG. 1.

FIG. 2 is a diagram of example components of a device 200 that may correspond to user device 110, PGW 120, SCGW 130, CD server 140, and/or HSS/AAA 145. Alternatively, each of user device 110, PGW 120, SCGW 130, CD server 140, and/or HSS/AAA 145 may include one or more devices 200. Device 200 may include a bus 210, a processor 220, a memory 230, an input component 240, an output component 250, and a communication interface 260. Although FIG. 2 shows example components of device 200, in other implementations, device 200 may contain fewer components, additional components, different components, or differently arranged components than depicted in FIG. 2. For example, device 200 may include one or more switch fabrics instead of, or in addition to, bus 210. Additionally, or alternatively, one or more components of device 200 may perform one or more tasks described as being performed by one or more other components of device 200.

Bus 210 may include a path that permits communication among the components of device 200. Processor 220 may include one or more processors, microprocessors, or processing logic that may interpret and execute instructions. Memory 230 may include any type of dynamic storage device that may store information and instructions, for execution by processor 220, and/or any type of non-volatile storage device that may store information for use by processor 220.

Input component 240 may include a mechanism that permits a user to input information to device 200, such as a keyboard, a keypad, a button, a switch, etc. Output component 250 may include a mechanism that outputs information to the user, such as a display, a speaker, one or more light emitting diodes (LEDs), etc. Communication interface 260 may include any transceiver-like mechanism that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 260 may include mechanisms for communicating with another device or system via a network, such as service provider network 160 and/or network 170. In one alternative implementation, communication interface 260 may be a logical component that includes input and output ports, input and output systems, and/or other input and output components that facilitate the transmission of data to other devices.

As described herein, device 200 may perform certain operations associated with a content distribution network. Device 200 may perform these operations in response to processor 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Figure 3:
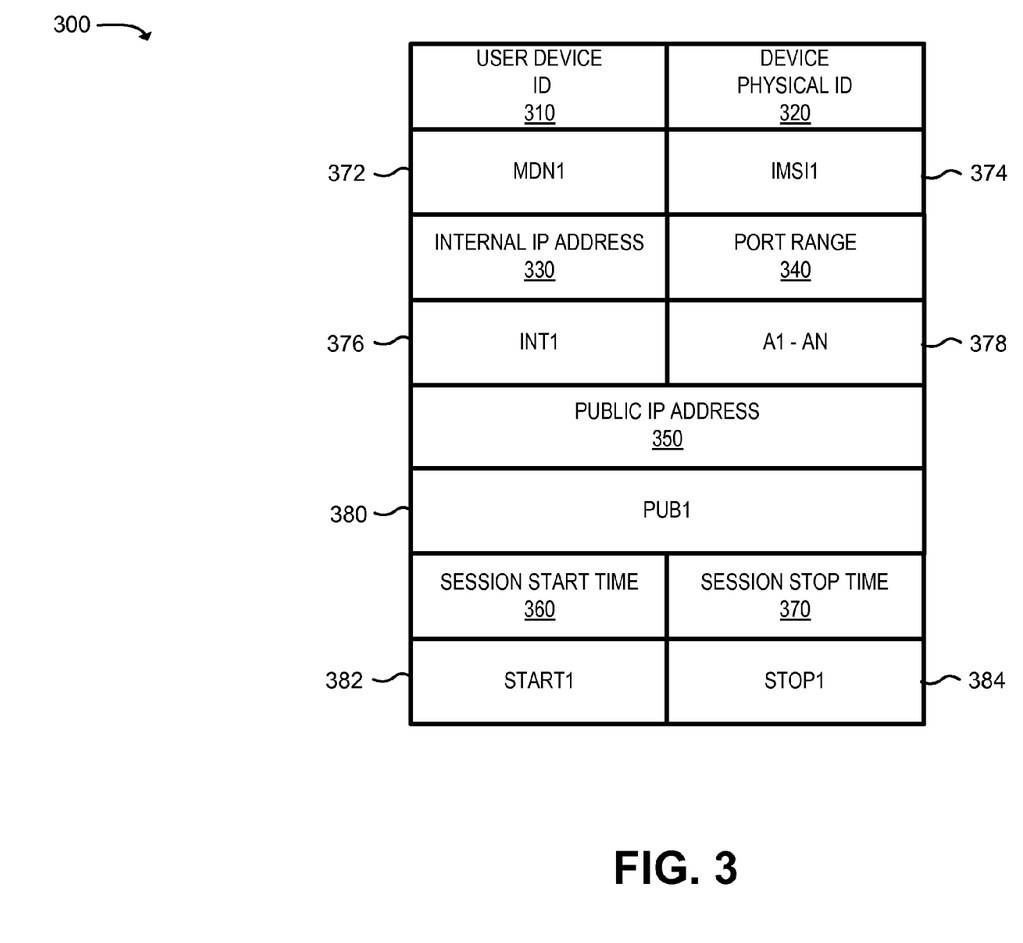
FIG. 3 is a diagram of an example data structure associated with a pilot packet according to an implementation described herein.

FIG. 3 is a diagram of an example data structure 300 associated with a pilot packet (hereinafter referred to as "pilot packet data structure 300") according to an implementation described herein. PWG 120 may perform a NAT operation associated with user device 110 and may store information associated with user device 110 and/or information associated with NAT bindings in pilot packet data structure 300. As shown in FIG. 3, pilot packet data structure 300 may include a collection of fields, such as a user device identifier (ID) field 310, a physical device identifier (ID) field 320, an internal IP address field 330, a port range field 340, a public IP address field 350, a session start time field 360, and a session stop time field 370. Pilot packet data structure 300 includes fields 310-370 for explanatory purposes. In practice, pilot packet data structure 300 may include additional fields, fewer fields, different fields, and/or differently arranged fields than are described with respect to pilot packet data structure 300.

User device ID field 310 may store a device identifier (e.g., a MDN, a MAC address, etc.) associated with a particular user device 110 for which a communication session is being established. Physical device ID field 320 may store a physical device identifier (e.g., an IMSI, an IMEI, an ESN, a MIN, a MSISDN number, a NAI, etc.) associated with the particular user device 110. Internal IP address field 330 may store an internal IP address associated with the particular user device 110. Port range field 340 may store one or more port identifiers associated with the internal IP address.

Public IP address field 350 may store a unique public IP address, associated with the particular user device 110, that corresponds to the private IP address. Session start time field 360 may store a point in time when a session, associated with the particular user device 110, begins. Session stop time field 370 may store another point in time when the session expires.

PGW 120 may receive a packet from user device 110 and the pilot application may remove, from the packet, a user device ID and/or a physical device ID associated with user device 110. The pilot application may store, in a pilot packet data structure (e.g., pilot packet data structure 300), a device ID 372 (e.g., MDN1) and/or a physical device ID 374 (e.g., IMSI1).

PGW 120 may, in response to receiving the packet, perform a NAT operation on user device 110. For example, PGW 120 may identify an internal IP address (e.g., that is not being used by user device 110 and/or another user device 110). PGW 120 may identify one or more ports, associated with the internal IP address and which are not being used by user device 110 and/or the other user device 110. The pilot application may store, in the pilot packet data structure, an internal IP address 376 (e.g., INT1) and/or one or more port identifiers 378 (e.g., A1–AN) (where N≧1) that correspond to the one or more ports.

PGW 120 may assign, to user device 110, a unique public IP address that corresponds to the internal IP address and/or the one or more ports. The pilot application may store, in pilot packet data structure 300, a unique public IP address 380 (e.g., PUB1). The pilot application may identify a time when a session, associated with user device 110, is established and/or another time when the session expires. The pilot application may store a time 382 (e.g., start1) and/or another time 384 (e.g., stop1) in pilot packet data structure 300. The pilot application may generate a pilot packet and may append information associated with pilot packet data structure 300 to the pilot packet (e.g., as a header, trailer, or payload).

Figure 4:
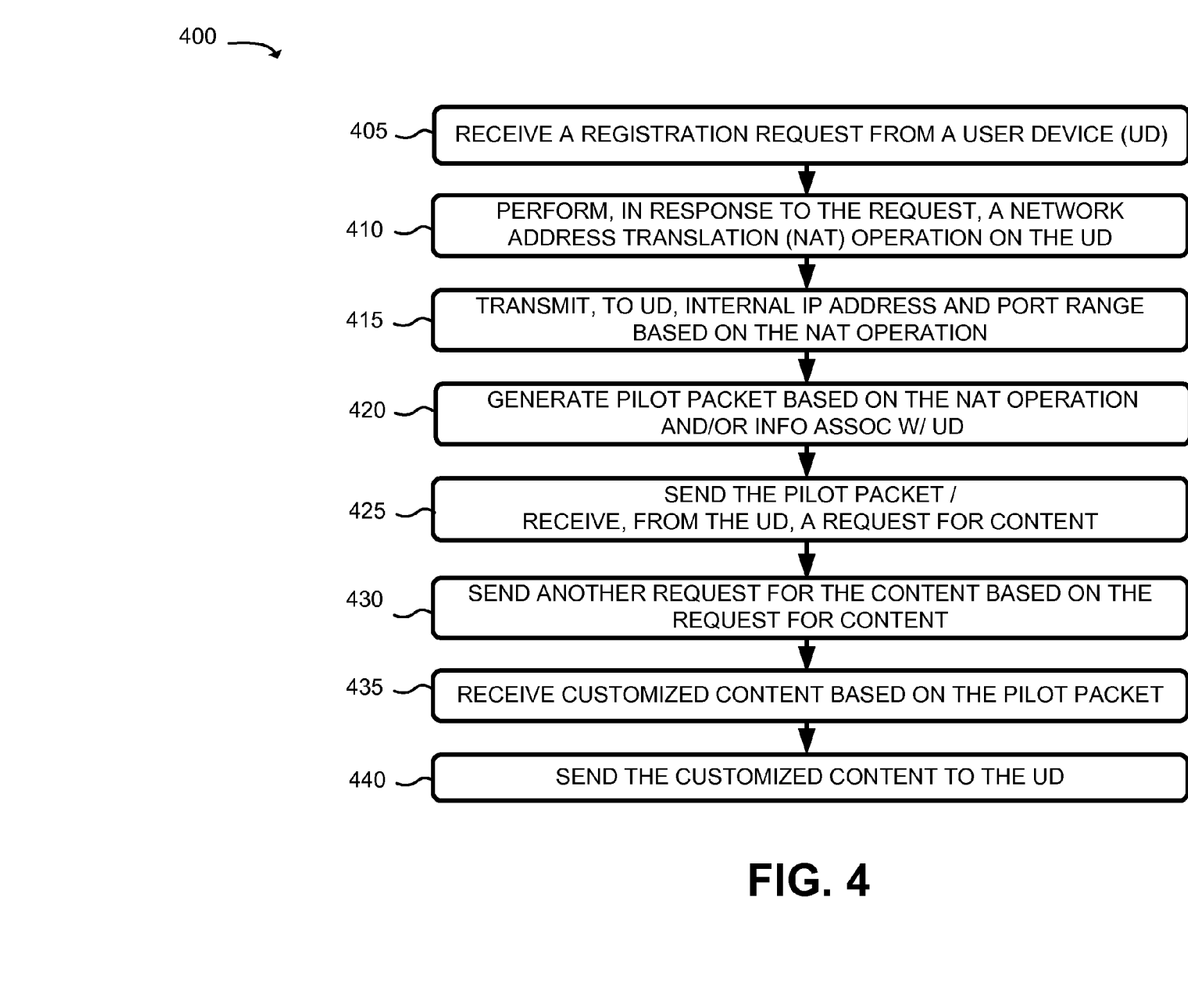
FIG. 4 is a flow chart of an example process for generating a pilot packet that enables content to be customized for a user device according to an implementation described herein.
Figure 5:
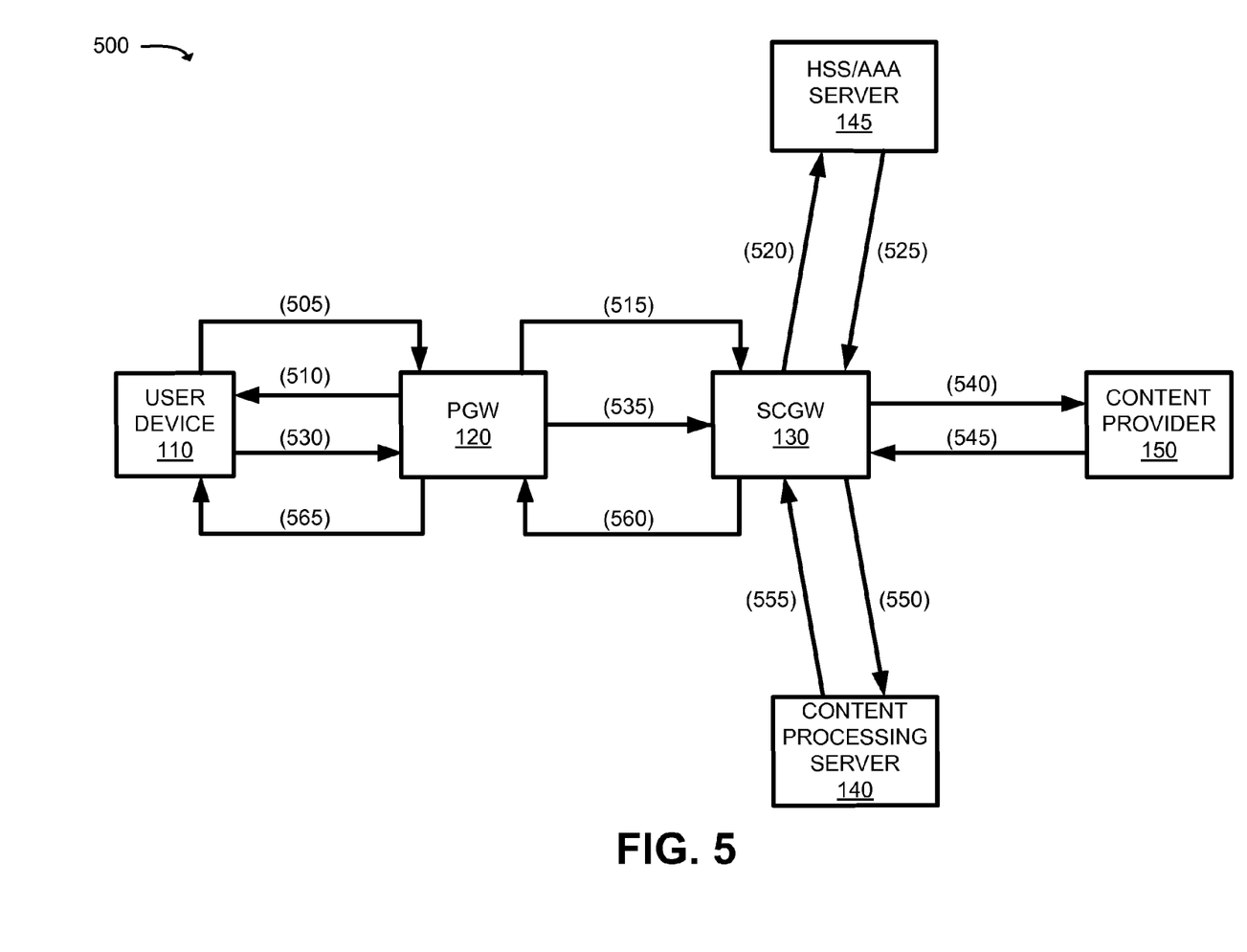
FIG. 5 is a diagram of example interactions between devices of an example portion of the environment of FIG. 1.

FIG. 4 is a flow chart of an example process 400 for generating a pilot packet that enables content to be customized for user device 110 according to an implementation described herein. In one example implementation, process 400 may be performed by PGW 120. In another example implementation, some or all of process 400 may be performed by a device or collection of devices separate from, or in combination with, PGW 120. FIG. 5 is a diagram of example interactions between devices of an example portion 500 of environment 100. As illustrated in FIG. 5, example environment portion 500 may include user device 110, PGW 120, SCGW 130, CP server 140, HSS/AAA 145, and content provider 150. User device 110, PGW 120, SCGW 130, CP server 140, HSS/AAA 145, and content provider 150 may include the features described above in connection with one or more of FIGS. 1 and 2. A portion of process 400 of FIG. 4 will be discussed below with corresponding references to the operations performed by example environment portion 500 of FIG. 5.

As shown in FIG. 4, process 400 may include receiving a registration request from user device 110 (block 405) and performing, in response to the request, a NAT operation on user device 110 (block 410). For example, user device 110 may send a registration request 505 (FIG. 5) to PGW 120. Registration request 505 may include information associated with user device 110, such as a device identifier (e.g., MDN, MAC address, etc.), and/or a physical device identifier (e.g., an IMSI, an IMEI, an ESN, a MIN, a MSISDN number, a NAI, etc.). PGW 120 may receive registration request 505 and may perform a NAT operation. For example, PGW 120 may obtain, from registration request 505, the information associated with user device 110. PGW 120 may identify an internal IP address and/or a port range to be used by a service provider network (e.g., service provider network 160). PGW 120 may create a NAT binding, associated with user device 110, by assigning the internal IP address and/or the port range to user device 110. Additionally, or alternatively, PGW 120 may identify a unique public IP address to be used by a network other than the service provider network (e.g., network 170). PGW 120 may create the NAT binding by assigning the unique public IP address to user device 110 in a manner that corresponds to the internal IP address and/or the port range. PGW 120 may store, in a memory associated with PGW 120, information associated with the NAT binding.

In another example, PGW 120 may receive, from user device 110, a request for content that is hosted by a content provider (e.g., content provider 150). The pilot application may determine whether a pilot packet associated with user device 110, that is generated at a prior point in time, has expired. For example, the pilot application may determine whether a time at which the pilot packet expires is before or after a current time. The pilot application may drop and/or ignore the request for content when the pilot packet expires based on a determination that the time is before the current time. The pilot application may, in another example, perform a NAT operation on the user device, in a manner similar to that described above, based on a determination that the pilot packet has expired. If the pilot application determines that the pilot packet has not expired, then the pilot application may cause PGW 120 to send the packet to SCGW 130 to retrieve the content.

As also shown in FIG. 4, process 400 may include transmitting, to user device 110, the internal IP address and/or the port range based on the NAT operation (block 415) and generating a pilot packet based on the NAT operation and/or information associated with user device 110 (block 420). For example, PGW 120 may send, in response to registration request 505, an internal IP address and/or one or more port identifiers associated with the port range, as indicated by reference number 510 (FIG. 5), to user device 110. User device 110 may receive the internal IP address and/or the one or more port identifiers.

A pilot application, hosted by PGW 120, may use the information, associated with the NAT bindings and/or information, associated with user device 110, to generate a pilot packet. The pilot application may, for example, generate a pilot packet associated with user device 110. The pilot application may store, in the pilot packet, the information associated with the NAT binding that corresponds to user device 110. The information associated with the NAT binding may include the internal IP address, the port range, and/or the unique public IP address. The pilot application may, in another example, store information associated with user device 110 in the pilot packet. In yet another example, the pilot application may store, in the pilot packet, a time at which a session, associated with user device 110, is established and/or another time at which the session expires. The time at which the session is established may correspond to a time when the registration request is received, when the internal IP address is transmitted to user device 110, when the pilot packet is generated, and/or some other time.

As further shown in FIG. 4, process 400 may include sending the pilot packet and/or receiving, from user device 110, a request for content (block 425). For example, the pilot application may cause PGW 120 to send the pilot packet, as indicated by reference number 515 (FIG. 5), to SCGW 130. SCGW 130 may receive pilot packet 515 and may remove the information associated with user device 110 and/or the NAT binding from pilot packet 515. SCGW 130 may send a request 520 for information associated with user habits and/or a user profile, associated with user device 110 (FIG. 5), to HSS/AAA 145. Request 520 may include the information associated with user device 110 and/or the NAT binding. HSS/AAA 145 may receive request 520 and may use the information, associated with user device 110 and/or the NAT binding, to retrieve, from a memory associated with HSS/AAA 145, the information associated with the usage habits and/or user profile. HSS/AAA 145 may send information 525 associated with the usage habits and/or the user profile (FIG. 5) to SCGW 130, and SCGW 130 may receive information 525. A user, of user device 110, may instruct user device 110 to retrieve content from a content provider (e.g., content provider 150). For example, user device 110 may send a request 530 for the content to PGW 120. PGW 120 may receive request 530 for the content and may generate another request 535 for the content, based on request 530 for the content.

As yet further shown in FIG. 4, process 400 may include sending another request for the content based on the request for content (block 430). For example, PGW 120 may obtain, from request 530 for content, an internal IP address and/or port associated with user device 110. PGW 120 may, based on NAT bindings associated with user device 110, identify a public IP address associated with user device 110. PGW 120 may send other request 535 for content to SCGW 130. Other request 535 may include an address associated with content provider 150 from which the content is to be obtained and/or the public IP address.

In another example, PGW 120 may determine that the NAT binding, associated with user device 110, has expired. PGW 120 may, for example, determine that a current time is after at time at which the NAT binding and/or a pilot packet has expired. PGW 120 may initiate a registration operation with user device 110 to obtain an updated NAT binding and/or to establish another communication session in a manner similar to that described above (e.g., with respect to blocks 405-415). PGW 120 may send other request 535 for content and/or another pilot packet (e.g., that includes information associated with the updated NAT binding) to SCGW 130.

SCGW 130 may receive other request 535 and may, in response to other request 535 for content, send a further request 540 for the content to content provider 150. Content provider 150 may receive further request 540 and may retrieve the content in response to further request 540.

As further shown in FIG. 5, content provider 150 may send content 545 to SCGW 130. SCGW 130 may receive content 545 and may determine a manner in which content 545 is to be processed and/or customized based on the usage habits and/or user profile associated with user device 110. For example, SCGW 130 may determine that user device 110 is not to receive one or more genres of content based on usage habits. In another example, SCGW 130 may determine that user device 110 is not to receive particular content based on parental controls specified in the information associated with the user profile. In yet another example, SCGW 130 may determine that user device 110 is located at a particular location, has one or more preferred genres of content, and/or has a particular purchasing history. SCGW 130 may send the received content, as indicated by reference number 550 (FIG. 5), to CP server 140 to be processed. Received content 550 may include information obtained from the information associated with the usage habits and/or the user profile. For the example, the obtained information may identify the one or more genres that user device 110 is not to receive, the parental controls, the particular location, the one or more preferred genres, and/or the particular purchasing history associated with user device 110. CP server 140 may receive content 550 and may process content 550 in a manner that customizes the content, for user device 110, based on the information associated with the usage habits and/or the user profile.

In another example implementation, SCGW 130 may not send received content 550 to CP server 130 to be processed. In one example, SCGW 130 may determine that the pilot packet has expired and may drop received content 550. In another example, SCGW 130 may process content 550 based on the information associated with the usage habit and/or user profile. In yet another example implementation, SCGW 130 may send information associated with usage habits and/or the user profile to content provider 150 in a manner that enables content provider 150 to generate the content that is customized to user device 110. In this example, SCGW 130 may perform an operation to parse and/or remove particular information, from the information associated with the usage habits and/or user profile, to ensure that content provider 150 cannot identify user device 110 and/or access information associated with a user of user device 110.

As still further shown in FIG. 4, process 400 may include receiving the customized content and may send the customized content to user device 110 (block 440). For example, CP server 140 may send customized content 555 (FIG. 5) to SCGW 130. SCGW 130 may receive customized content 555 and may forward the customized content, as indicated by reference number 560 (FIG. 5), to PGW 120. PGW 120 may receive customized content 560 and may identify a public IP address associated with customized content 560. Based on the public IP address, PGW 120 may identify the NAT bindings associated with user device 110 from which the private IP address and/or port may be identified. PGW 120 may use the private IP address and/or port to forward the customized content, as indicated by reference number 565 (FIG. 5), to user device 110. User device 110 may receive customized content 565 and may render customized content 565 on user device 110.

In another example, PGW 120 may determine that the NAT binding and/or pilot packet, associated with user device 110, has expired. PGW 120 may, for example, determine that a current time is after at time at which the NAT binding has expired. PGW 120 may not forward customized content 565 to user device 110 based on the determination that the NAT binding has expired. PGW 120 may initiate a registration operation with user device 110 to establish another communication session in a manner similar to that described above (e.g., with respect to blocks 405-415).

Systems and/or methods, described herein, may enable a pilot application to generate a pilot packet that is to be used to customize content for a user device during a communication session. The systems and/or methods may store, in the pilot packet, information associated with the user device and/or information associated with NAT bindings that correspond to the user device. The systems and/or methods may transmit the pilot packet to a network device (e.g., a service control gateway). The service control gateway may use the information associated with the user device and/or the NAT bindings, obtained from the pilot packet, to retrieve information associated with user habits, user preferences, a user profile, etc. that corresponds to the user device. The service control gateway may use the information associated with the user habits, user preferences, and/or user profile to customize the content to be served to the user device.

The foregoing description provides illustration and description, but is not intended to be exhaustive or to limit the implementations to the precise form disclosed. Modifications and variations are possible in light of the above teachings or may be acquired from practice of the embodiments.

While a series of blocks has been described with regard to FIG. 4, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an application-specific integrated circuit (ASIC), or a field-programmable gate array (FPGA), or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the embodiments. In fact, many of these features may be combined in ways not specifically recited in the claims and/or disclosed in the specification. Although each dependent claim listed below may directly depend on only one other claim, the disclosure of the embodiments includes each dependent claim in combination with every other claim in the claim set.

No element, act, or instruction used in the present application should be construed as critical or essential to the embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, by a device and from a user device, a request to register with a network associated with the device;
   performing, by the device and in response to the request, a network address translation (NAT) operation on the user device, where the NAT operation enables the user device to communicate with the network or obtain content from another network;
   generating, by the device, a pilot packet that includes information associated with the user device and information obtained as a result of the NAT operation;
   providing the pilot packet, by the device and to another device, where the pilot packet enables the other device to:
      retrieve information associated with usage habits, that correspond to the user device, based on the information associated with the user device or the information, obtained as a result of the NAT operation, provided via the pilot packet;
   receiving, by the device and from the user device, a query to obtain the content from the other network;
   providing, by the device and to the other device, a content request, based on the query;
   receiving, by the device and from the other device, the requested content, where the requested content is customized for the user device based on the information associated with the usage habits; and
   providing, by the device and to the user device, the customized content.

2. The method of claim 1, where performing the NAT operation includes:
   assigning, to the user device, an internal Internet protocol (IP) address that is used by the user device when communicating with the network; and
   assigning, to the user device, a public IP address that corresponds to the internal IP address, where the public IP address enables the user device to communicate with the other network.

3. The method of claim 1, where generating the pilot packet includes:
   storing, in the pilot packet, the information associated with the user device and the information obtained as a result of the NAT operation.

4. The method of claim 1, where performing the NAT operation further includes:
   providing, to the user device and in response to the request, an internal Internet protocol (IP) address that is assigned to the user device as a result of the NAT operation, where the internal IP address enables the user device to communicate with the network.

5. The method of claim 1, where the information obtained as a result of the NAT operation includes a lease that identifies a period of time for which an Internet Protocol (IP) address, to be used by the other device, is to remain valid.

6. The method of claim 1, further comprising:
   receiving, from the other device, other customized content destined for another user device;
   determining, whether an Internet protocol (IP) address, associated with the other customized content, has expired based on a current time and a time when the IP address expires, where the time when the IP address expires is identified in another pilot packet that is outputted to the other device;
   dropping the other customized content when the current time occurs after the time when the IP address expires; and
   providing the other customized content to the other user device, when the current time is before the time when the IP address expires.

7. The method of claim 1, where the pilot packet stores at least one of:
   a private Internet protocol (IP) address that enables the user device to communicate with the network,
   one or more port identifiers, that correspond to one or more ports on the device, via which the user device communicates with the network, where the one or more ports are associated with the private IP address,
   a public IP address that enables the user device to communicate with the other network,
   a device identifier associated with the user device, or
   a lease that identifies a period of time during which the public IP address or the private IP address are valid.

8. A device, comprising:
   a memory to store a network address translation (NAT) binding that corresponds to a user device, where the NAT binding includes:
      an internal Internet protocol (IP) address that is used by the user device to communicate with a network associated with the device, and
      a public IP address that is used by the user device to communicate with another network; and
   a processor to:
      receive, from the user device, a request for content from the other network,
      generate, in response to the request, a pilot packet that includes the NAT binding obtained from the memory, and information associated with the user device obtained from the request, send the pilot packet, to another device associated with the network, where the pilot packet enables the other device to:
obtain information associated with usage habits or a user profile, that corresponds to the user device, based on the information associated with the user device or the information, associated with the NAT binding, obtained from the pilot packet,
send, to the other device, another request for the content based on the request for the content received from the user device,
receive, from the other device, the content, where the content is customized for the user device based on the information associated with the usage habits or the user profile, and
send the customized content to the other device.

9. The device of claim 8, where the processor is further to:
receive a registration request from the user device,
assign, in response to the registration request, the internal IP address to the user device,
assign, to the user device, the public IP address that corresponds to the internal IP address, and
send the internal IP address to the user device.

10. The device of claim 9, where, when assigning the internal IP address to the user device, the processor is further to:
identify one or more ports, associated with the internal IP address, via which the user device is to communicate, and
assign, as a port range, one or more port identifiers that correspond to the one or more ports.

11. The device of claim 8, where, when generating the pilot packet, the processor is to:
store, in the pilot packet, at least one of:
the information associated with the user device,
the information associated with the NAT binding, or
information associated with a lease, where the information associated with the lease identifies a period of time when the information associated with the NAT binding is valid.

12. The device of claim 8, where the information associated with the usage habits or user profile identifies a preferred content genre or parental controls associated with a plurality of content to be received by the user device, and
where the customized content includes the preferred content and precludes particular content based on the parental controls.

13. The device of claim 8, where the processor is further to:
receive, from the user device, a further request for other content,
determine, based on the further request, that the NAT binding has expired based on information associated with a lease that is stored in the pilot packet, and
send, to the user device, an indication that the user device is to register with the network.

14. The device of claim 8, where the pilot packet includes at least one of:
a mobile directory number (MDN) or a media access control (MAC) address associated with the user device, or
a lease that identifies a period of time during which the public IP address or the internal IP address are valid.

15. A non-transitory computer-readable medium containing one or more instructions executable by at least one processor, the computer-readable medium comprising:
one or more instructions to receive, from a user device, a request for content;
one or more instructions to assign, to the user device and in response to the request, a first Internet protocol (IP) address and a second IP address,
where the first IP address enables the user device to communicate with a network associated with the user device, and
where the second IP address enables the user device to communicate with another network to obtain the content;
one or more instructions to generate a pilot packet that includes the first IP address, the second IP address, and information associated with the user device;
one or more instructions to obtain the content from a server device based on the pilot packet, where the pilot packet enables the server device to:
identify the user device within a period of time that is less than a threshold,
retrieve information associated with usage habits or preferences, associated with the user device, and
customize the content, to the user device, based on the information associated with the usage habits or preferences; and
one or more instructions to transmit the customized content to the user device.

16. The computer-readable medium of claim 15, further comprising:
one or more instructions to determine, in response to the request, that a lease, associated with another pilot packet, has expired; and
one or more instructions to identify that a communication session, associated with the user device, has expired or that the user device is not registered with the network, based on the determination that the lease has expired.

17. The computer-readable medium of claim 15, where the one or more instructions to assign the first Internet protocol (IP) address and the second IP address further include:
one or more instructions to assign, to the user device, a port range that corresponds to the first IP address, where the port range includes one or more ports via which the user device communicates with the network; and
one or more instructions to identify a further point in time at which the first IP address or the second IP address expire.

18. The computer-readable medium of claim 17, where the one or more instructions to generate the pilot packet further include:
one or more instructions to store, in the pilot packet, one or more port identifiers that correspond to the one or more ports or information associated with a lease, where the lease includes the further point in time at which the first IP address or the second IP address expires.

19. The computer-readable medium of claim 15, where the threshold corresponds to another period of time for the server device to identify the user device in a manner that does not include the pilot packet.

20. The computer-readable medium of claim 15, where the threshold corresponds to another period of time for the server device to identify the user device by retrieving information, associated with the user device, based on an IP address obtained from a packet received from the user device.

21. The computer-readable medium of claim 15, where the one or more instructions to assign the first Internet protocol (IP) address and the second IP address further include:
one or more instructions to transmit the first IP address to the user device in order to establish a communication session via which the user device receives the content.

22. The computer-readable medium of claim 15, further comprising:
one or more instructions to obtain, from the server device and at a later point in time, other customized content that is destined for the user device;
one or more instructions to determine that a lease, associated with the pilot packet, has expired; and
one or more instructions to drop the other customized content based on the determination that the lease has expired.

23. The computer-readable medium of claim 15, where the information associated with the usage habits or preferences identifies preferred types of content or purchasing habits associated with the user device, and
where the customized content includes the preferred types of content or one or more offers for goods or services that correspond to the purchasing habits.

* * * * *